United States Patent [19]

Blount et al.

[11] Patent Number: 4,539,349

[45] Date of Patent: Sep. 3, 1985

[54] UNSATURATED POLYESTER COMPOSITIONS COMPRISING CARBOXYLATED CELLULOSE ESTER

[75] Inventors: William W. Blount, Surgoinsville; William M. Robinette, Kingsport, both of Tenn.

[73] Assignee: Eastman Kodak Company, Rochester, N.Y.

[21] Appl. No.: 605,349

[22] Filed: Apr. 30, 1984

[51] Int. Cl.³ .......................... C09D 3/14; C08L 1/04; C08L 1/26
[52] U.S. Cl. ..................................... 523/509; 524/37; 524/38; 524/39
[58] Field of Search .................... 523/509; 524/37, 38, 524/39; 106/169

[56] References Cited

U.S. PATENT DOCUMENTS

| | | | |
|---|---|---|---|
| 3,711,432 | 1/1973 | Shah | 523/509 |
| 3,862,064 | 1/1975 | Fry | 523/509 |
| 3,878,137 | 4/1975 | Hess et al. | 523/509 |
| 3,940,350 | 2/1976 | Hess et al. | 523/509 |
| 4,034,764 | 7/1977 | Rainer et al. | 536/56 |
| 4,134,809 | 1/1979 | Pacifici et al. | 428/417 |

FOREIGN PATENT DOCUMENTS 56-116713  9/1981  Japan .................................... 523/509

*Primary Examiner*—Ronald W. Griffin
*Attorney, Agent, or Firm*—Donald W. Spurrell; David E. Cotey; J. Frederick Thomsen

[57] ABSTRACT

The present invention relates to novel unsaturated polyester compositions and to a process for the preparation thereof. The composition comprises an unsaturated polyester, a reactive solvent for the unsaturated polyester, and at least about 0.5% by weight of a carboxylated cellulose ester. The unsaturated polyester comprises the reaction product of a diacid component which comprises at least about 50% by weight of an ethylenically unsaturated dicarboxylic acid and a diol component. The process of the present invention comprises reacting a diacid component with a diol component so as to form an unsaturated polyester resin, dissolving the unsaturated polyester resin in a solvating quantity of a reactive solvent, the resulting solution further comprising at least about 0.5% by weight of a carboxylated cellulose ester, and curing the solution in the substantial absence of additional initiator so as to form a substantially clear, solid unsaturated polyester composition.

28 Claims, No Drawings

UNSATURATED POLYESTER COMPOSITIONS COMPRISING CARBOXYLATED CELLULOSE ESTER

DESCRIPTION

The present invention relates to novel unsaturated polyester compositions and to a unique process for the preparation thereof.

It is known in the art that thermoplastic materials are frequently incorporated into thermoset resin systems in order to enhance certain performance properties. More specifically, the properties of unsaturated polyesters can be improved by the inclusion therein of various thermoplastic materials. For example, cellulose acetate butyrate can be blended with polyester baking enamels to improve flow properties, increase the rate of solvent evaporation, and reduce the severity of surface defects. However, when an ordinary cellulose ester, such as cellulose acetate butyrate, is incorporated into a thermosetting polyester resin, the composition experiences a change from a clear solution before cure to a biphased, milky-white solid polymer after cure. The inclusion of the cellulose ester may be desirable in order to provide improvements in properties, but the loss in clarity of the resin composition often is undesirable.

It has now been found that the use of a different specified cellulosic material, referred to herein as a carboxylated cellulose ester, in such unsaturated polyester resins yields a composite having improved toughness, clarity, dimensional stability, surface properties, etc. The use of the carboxylated cellulose ester provides process improvements as well. The curing of an unsaturated polyester composition which includes a carboxylated cellulose ester can be accomplished at lower temperatures than are required for prior art compositions and can be accomplished in the absence of added initiator. Prior art unsaturated polyester compositions have required an initiator, such as a peroxide (e.g., benzoyl peroxide, t-butylperbenzoate, etc.).

SUMMARY OF THE INVENTION

In one aspect of the present invention there is provided a novel unsaturated polyester composition. The composition comprises an unsaturated polyester which comprises the reaction product of (i) a diacid component which comprises at least about 50% by weight of an ethylenically unsaturated dicarboxylic acid and (ii) a diol component; a reactive solvent for the unsaturated polyester; and at least about 0.5% by weight, based upon the total weight of the composition, of a carboxylated cellulose ester.

In another aspect of the present invention there is provided a process for the preparation of a cured unsaturated polyester composition. The novel process comprises the steps of reacting (i) a diacid component which comprises at least about 50% by weight of an ethylenically unsaturated dicarboxylic acid with (ii) a diol component so as to form an unsaturated polyester resin; dissolving the unsaturated polyester resin in a solvating quantity of a reactive solvent, the resulting solution further comprising at least about 0.5% by weight, based upon the total weight of said solution, of a carboxylated cellulose ester; and curing the solution in the substantial absence of additional initiator so as to form a substantially clear, solid unsaturated polyester composition.

DETAILED DESCRIPTION OF THE INVENTION

The present invention provides a novel unsaturated polyester composition and a process for preparing the composition.

The novel unsaturated polyester composition of the present invention comprises an unsaturated polyester, a reactive solvent for the unsaturated polyester, and a carboxylated cellulose ester. The unsaturated polyester comprises the reaction product of a diacid component and a diol component.

The diacid component of the unsaturated polyester comprises at least about 50% by weight of an ethylenically unsaturated dicarboxylic acid. In preferred embodiments, the diacid component comprises about 60 to 80% by weight of an ethylenically unsaturated diacid. Typically, the ethylenically unsaturated diacid comprises maleic acid, fumaric acid, or a mixture thereof. Preferably, the unsaturated diacid of the diacid component is derived from maleic anhydride, which, during the formation of the polyester, commonly reacts so as to provide about 90% fumaric acid units and 10% maleic acid units.

The diacid component may further comprise other well-known polyester-forming dicarboxylic acids. Such acids are well known in the art and may include, for example, terephthalic acid, isophthalic acid, phthalic acid, adipic acid, sebacic acid, succinic acid, the corresponding acid anhydrides, chlorides, and halides, mixtures of the foregoing, etc. Preferred additional dicarboxylic acids comprise isophthalic acid, phthalic acid, adipic acid, or mixtures thereof.

The unsaturated polyester further comprises a diol component. Any of the well-known polyester-forming diols containing up to about 20 carbon atoms (preferably, up to about 12 carbon atoms) can be employed in the unsaturated polyester composition of the present invention. The diol component may comprise aromatic or aliphatic diols, although aliphatic diols are preferred. Suitable diols include ethylene glycol, propylene glycol, 1,3-butanediol, 1,4-butanediol, diethylene glycol, dipropylene glycol, 1,6-hexanediol, 1,4-cyclohexanedimethanol, neopentyl glycol, 2,2,4-trimethyl-1,3-pentanediol, etc. Especially preferred diols include ethylene glycol, propylene glycol, neopentyl glycol, 1,4-cyclohexanedimethanol, 2,2,4-trimethyl-1,3-pentanediol, mixtures thereof, etc.

The unsaturated polyester composition of the present invention further comprises a reactive solvent for the unsaturated polyester. In the art of unsaturated polyesters, styrene is typically employed as the reactive solvent because of its good compatibility with unsaturated polyesters and its excellent reactivity. Of course, other suitable reactive solvents also may be employed.

The unsaturated polyester composition of the present invention further comprises a carboxylated cellulose ester. Carboxylated cellulose esters comprise a new class of cellulosic materials which are described in detail in U.S. patent application Ser. No. 581,014, filed Feb. 17, 1984, the disclosure of which is incorporated herein by reference in its entirety. The carboxylated cellulose esters are manufactured by reacting ordinary cellulose esters with ozone. Specific cellulose esters which are useful in the preparation of carboxylated cellulose esters include cellulose acetate, cellulose propionate, cellulose butyrate, cellulose acetate butyrate, cellulose acetate propionate, mixtures thereof, etc. In the manufacture of carboxylated cellulose esters, the cellulose ester starting material is provided to a reaction zone in a form which is suitable for reaction with ozone. For example, it is possible to provide the cellulose ester in the form of a solution in an appropriate solvent (i.e., one in which both the cellulose ester starting material and the carboxylated cellulose ester product are soluble), as an aqueous slurry, or, preferably, in a solid particulate form. Most preferably, the cellulose ester is provided in the form of a powder. In the reaction zone, the cellulose ester is intimately contacted with a gaseous stream comprising ozone. Most preferably, the gaseous stream containing ozone is passed through a distributor plate and through a cellulose ester powder so as to create a fluidized solid. The gaseous stream preferably comprises at least about 0.25 weight percent ozone, based upon the total weight of gas present in the reaction system. The reaction is conducted at a temperature of about 25° to 80° C. (preferably about 50° to 75° C.). The cellulose ester is reacted with the ozone for a period of time sufficient to yield a carboxylated cellulose ester product. Commonly, desirable products are obtained by reacting the cellulose ester starting material with ozone for a period of time of at least about 0.5 hour.

Typically, desirable carboxylated cellulose ester products have an acid number of at least about 5. Preferably, the acid number of the carboxylated cellulose ester is about 10 to 35 (e.g., about 12 to 20). The carboxylated cellulose ester product may be characterized further by determining indirectly the molecular weight of the product, e.g., by inherent viscosity. The carboxylated cellulose ester product exhibits an inherent viscosity of about 0.01 to 1.00 (preferably, about 0.05 to 0.5).

The unsaturated polyester composition of the present invention comprises at least about 0.5% by weight, based upon the total weight of the composition, of a carboxylated cellulose ester. Preferably, the carboxylated cellulose ester is present in an amount of about 1 to 25% by weight (e.g., about 5 to 15% by weight). Carboxylated cellulose esters which are useful in the present invention include carboxylated cellulose acetate, carboxylated cellulose propionate, carboxylated cellulose butyrate, carboxylated cellulose acetate propionate, carboxylated cellulose acetate butyrate, mixtures thereof, etc. Especially preferred carboxylated cellulose esters include carboxylated cellulose acetate propionate, carboxylated cellulose acetate butyrate, mixtures thereof, etc.

The unsaturated polyester composition described above, when cured, provides a glass-clear, water-white, hard thermoset product having excellent toughness, clarity, and surface properties. These characteristics are in contrast to prior art unsaturated polyesters modified with ordinary cellulose esters which, when cured, yield a milky-white, opaque or translucent solid polymer.

The unsaturated polyester composition of the present invention can be prepared by a novel process which, unlike prior art processes, does not require the addition of an initiator. In accordance with the process of the present invention, the diacid component described above is reacted in a manner well known in the art with the diol component described above so as to form an unsaturated polyester resin. Typically, the unsaturated polyester resin will exhibit a relatively low molecular weight. The unsaturated polyester resin is then dissolved in a solvating quantity of a reactive solvent (e.g., styrene). The resulting solution further comprises at least about 0.5% by weight, based upon the total weight of the solution, of a carboxylated cellulose ester. The carboxylated cellulose ester is compatible with and virtually completely soluble in typical unsaturated polyester resins. Although the carboxylated cellulose ester is commonly not soluble in styrene, the unsaturated polyester resin serves as a mutual solvent for all of the components of the composition.

The resulting solution is then cured so as to form a substantially clear, solid unsaturated polyester composition. The curing is effected in the substantial absence of additional initiator. Thus, typical prior art initiators, such as peroxides (e.g., benzoyl peroxide, t-butylperbenzoate, etc.) and other well-known free radical initiators, are not required in the process of the present invention. Furthermore, the curing step can be accomplished at temperatures well below those of prior art processes. In particular, temperatures less than about 100° C. can be employed, with temperatures of about 60° to 80° C. being preferred.

It is also possible to induce curing at room temperature (i.e., about 25° C.) by introducing a metal promoter. Such promoters are well known in the art and include organic compounds of cobalt, vanadium, etc. In particular, a vanadium "soap" comprising vanadium naphthenate, for example, has been found to be especially useful.

It is conceivable that free radical initiators, such as the peroxides mentioned above, etc., may be used to advantage in the preparation of certain of the unsaturated polyester compositions of the present invention. However, the use of additional initiator typically is not required and, in fact, often is undesirable.

While not wishing to be limited in any way by theoretical considerations, it appears that the advantageous effects arising from the use of carboxylated cellulose esters in the unsaturated polyester composition and in the process for preparing the same, as presently disclosed and claimed, may be due to the chemical structure of the carboxylated cellulose ester itself. In particular, it appears that peroxide groups are present upon the polymer backbone of the carboxylated cellulose ester. For example, a carboxylated cellulose acetate butyrate may contain approximately 0.5 milliequivalents of peroxide per gram of carboxylated cellulose ester (i.e., about one peroxide group per polymer molecule). It is believed that, during preparation of the unsaturated polyester composition of the present invention, these peroxide groups can function as free radical initiators, thereby alleviating the need for additional initiators, such as organic peroxides, etc.

Furthermore, it is believed that these peroxide groups enable the carboxylated cellulose ester to be grafted efficiently onto the unsaturated polyester resin, thereby overcoming the incompatibility problems inherent in prior art unsaturated polyester compositions. As a result, the compositions of the present invention, when cured, give a clear, solid resin, whereas prior art unsaturated polyester compositions which included an ordinary cellulose ester yielded a biphased, milky-white product.

Thus, the composition and process of the present invention provide unique advantages which arise from the incorporation of a carboxylated cellulose ester. These advantages were unforeseen at the time the present invention was made, especially in view of corresponding drawbacks accompanying the use of ordinary cellulose esters in analogous processes and compositions.

The properties of the unsaturated polyester composition of the present invention suggest its usefulness as a physical property modifier in thermoset resins (e.g., to improve tensile strength and elongation of pultruded composites). The composition of the present invention is contemplated also to be useful in UV-curable coatings for rigid and flexible substrates. Utility of the unsaturated polyester composition of the present invention in high-build wood coatings where low temperature cures are required is also indicated. The composition of the present invention is contemplated as being especially useful as a shrinkage control additive in low-profile sheet molding compounds.

This invention will be further illustrated by the following Examples although it will be understood that these Examples are included merely for purposes of illustration and are not intended to limit the scope of the invention.

COMPARATIVE EXAMPLE 1

This Comparative Example illustrates the preparation of a cured unmodified unsaturated polyester resin composition and the cure properties thereof.

An unsaturated polyester resin prepared from propylene glycol and maleic anhydride, designated as P-340 and available commercially from Owens Corning Fiberglas, was dissolved in styrene so that the resulting solution comprised 40% by weight styrene. The resulting solution (100 grams) was combined with 1 gram of t-butylperbenzoate (TBPB) to initiate curing, and the cure properties were then measured at 250° F. by standard SPI cure determinations. Specifically, the time to peak exotherm (TPE) and the peak exotherm temperature (PET) were determined. Generally speaking, for purposes of this test procedure, good cure properties are indicated by high PET and low TPE. The results for this Comparative Example are given in Table I.

COMPARATIVE EXAMPLE 2

This Example illustrates the preparation of a cured unsaturated polyester composition which incorporates an ordinary cellulose ester (specifically, cellulose acetate butyrate). The unsaturated polyester/styrene solution described in Comparative Example 1 (95 grams), 5 grams of a cellulose acetate butyrate designated as CAB-551-0.2 and available from Eastman Chemical Products, Inc., and 1 gram TBPB were employed in the preparation of the cured unsaturated polyester composition. The cure properties are given in Table I below. The resulting cured unsaturated polyester was opaque and milky-white in appearance.

COMPARATIVE EXAMPLE 3

This Example illustrates the preparation of an unsaturated polyester incorporating a typical cellulose ester in the absence of added initiator.

The unsaturated polyester/styrene solution described in Comparative Example 1 (95 grams) and the cellulose acetate butyrate described in Comparative Example 2 (5 grams) were mixed together and subjected to an elevated temperature in order to initiate curing. The cure properties are given in Table I below. As is evident from the results, no curing occurred in the absence of added initiator.

EXAMPLE 1

This Example illustrates the preparation of an unsaturated polyester composition in accordance with the present invention.

The unsaturated polyester/styrene solution described in Comparative Example 1 (95 grams) was mixed with 5 grams of a carboxylated cellulose acetate butyrate (acid number: 20±2; I.V.: 0.15), and curing was initiated by heating the resulting solution to 250° F. The cure properties of the composition are given in Table I.

TABLE I

| Run | TPE (min.) | PET (°F.) |
| --- | --- | --- |
| Comp. Ex. 1 | 4.00 | 420 |
| Comp. Ex. 2 | 4.75 | 415 |
| Comp. Ex. 3 | no peak | no peak |
| Ex. 1 | 2.00 | 460 |

As can be seen from the data, the cure properties of the composition of this Example are significantly better than those of the Comparative Examples. In particular, the time to peak exotherm is approximately half that of the compositions of Comparative Examples 1 and 2, and the peak exotherm temperature is substantially greater than that of Comparative Examples 1 and 2.

In addition, the cured composition of this Example provided a clear, water-white, solid thermoset product which had a smooth surface (indicating good shrinkage control).

Thus, this Example demonstrates again the advantages arising from the use of a carboxylated cellulose ester in the composition and the process of the present invention. A cured thermoset product having excellent aesthetic characteristics and good properties were obtained, and no added initiator was required in the curing of the composition.

EXAMPLE 2

This Example illustrates the preparation of an unsaturated polyester composition which comprises a carboxylated cellulose acetate propionate.

The unsaturated polyester/styrene solution described in Comparative Example 1 (97 grams) was mixed with 3 g of a carboxylated cellulose acetate propionate (acid no.: 20; I.V.: 0.139), and curing was initiated by heating the resulting solution to 250° F. The cure properties of the composition are given in Table II.

EXAMPLE 3

This Example illustrates the preparation of another unsaturated polyester composition comprising a carboxylated cellulose acetate propionate.

The unsaturated polyester/styrene solution described in Comparative Example 1 (94 grams) was mixed with 6 g of the carboxylated cellulose acetate propionate of Example 2, and curing was initiated by heating the resulting solution to 250° F. The cure properties of the composition are given in Table II.

EXAMPLE 4

This Example illustrates the preparation of an unsaturated polyester composition which comprises neopentyl glycol and a carboxylated cellulose acetate propionate.

The unsaturated polyester composition was prepared by a bulk polymerization ("fusion cook") process which is well known in the art. Specifically, 2.04 moles of neopentyl glycol and 1.0 mole of isophthalic acid were mixed together and were heated at 210° C. until the acid number of the product was less than about 10. The reaction mixture was cooled to about 150° C., and 1 mole of maleic anhydride was added to the reaction system. The reaction mixture was then heated to 210° C. and was processed at that temperature with the evolution of water until the acid number of the product was less than about 20 (i.e., in the range of 10 to 20). The reaction system was then cooled to 140° C., and the product was mixed with 45% by weight of styrene and 100 ppm hydroquinone. The resulting unsaturated polyester/styrene solution (97 grams) was mixed with 3 g of the carboxylated cellulose acetate propionate of Example 2, and curing was initiated by heating the resulting solution to 250° F. The cure properties of the composition are given in Table II.

EXAMPLE 5

This Example illustrates the preparation of another unsaturated polyester composition from the unsaturated polyester of Example 4 and the carboxylated cellulose acetate propionate of Example 2.

The unsaturated polyester/styrene solution described in Example 4 (94 grams) was mixed with 6 g of the carboxylated cellulose acetate propionate of Example 2. Curing was initiated by heating the resulting solution to 250° F. The cure properties of the composition are given in Table II.

TABLE II

| Run | TPE (Min.) | PET (°F.) |
| --- | --- | --- |
| Ex. 2 | 2.75 | 415 |
| Ex. 3 | 2.50 | 375 |
| Ex. 4 | 4 | 330 |
| Ex. 5 | 4.25 | 320 |

The data of Table II demonstrate that all of the compositions of Examples 2 through 5 demonstrate acceptable cure properties. In addition, the cured compositions of these Examples provided clear, water-white solid thermoset products. As is evident from the data of Tables I and II, the compositions comprising the carboxylated cellulose acetate propionate were not as reactive as those comprising the carboxylated cellulose acetate butyrate. Also, the resins comprising neopentyl glycol were not as reactive with the carboxylated cellulose acetate propionate as were those comprising propylene glycol.

EXAMPLE 6

This Example illustrates the preparation and physical properties of an unsaturated polyester composition which comprises neopentyl glycol and a carboxylated cellulose acetate butyrate.

The unsaturated polyester composition was prepared by a bulk polymerization process. Specifically, 2.04 moles of neopentyl glycol, 1.0 mole of dimethylcyclohexanedicarboxylate were mixed together and were heated at 210° C. until the acid number of the product was less than about 10. The reaction mixture was cooled to about 150° C., and one mole of maleic anhydride was added to the reaction system. The reaction mixture was then heated to 210° C. and was processed at that temperature until the acid number of the product was about 10 to 15 and the number average molecular weight was about 2500. The reaction system was then cooled to 140° C., and the product was mixed with 45% by weight of styrene and 100 ppm hydroquinone. The resulting unsaturated polyester/styrene solution (94 grams) was mixed with 6 grams of the carboxylated cellulose acetate butyrate described in Example 1. Final cure of the cast composition was achieved by heating in an oven to 100° C. for 1 to 2 hours. The cured composition provided a clear water-white solid thermoset product. The physical properties of the product are given below in Table III.

EXAMPLE 7

This Example illustrates the preparation and properties of an unsaturated polyester composition which comprises 1,2-propanediol and a carboxylated cellulose acetate butyrate.

The unsaturated polyester composition was prepared by a bulk polymerization process. Specifically, 2.08 moles of 1,2-propanediol and 1.0 mole of isophthalic acid were mixed together and were heated at 210° C. until the acid number of the product was less than about 10. The reaction mixture was cooled to about 150° C., and one mole of maleic anhydride was added to the reaction system. The reaction mixture was then heated to 210° C. and was processed at that temperature with the evolution of water until the acid number of the product was about 10 to 15 and the number average molecular weight was about 2500. The reaction system was then cooled to 140° C., and the product was mixed with 45% by weight of styrene and 100 ppm hydroquinone. The resulting unsaturated polyester/styrene solution (97 grams) was mixed with three grams of the carboxylated cellulose acetate butyrate of Example 1. Final cure of the cast composition was achieved by heating in an oven to 100° C. for 1 to 2 hours. The cured composition provided a clear, water-white solid thermoset product. The physical properties of the product are given below in Table III.

TABLE III

| Run | HDT (°C.) | Flex. Mod. (psi × $10^5$) | Flex. Str. (psi) | Izod Impact Str. (ft. lbs./in.) |
| --- | --- | --- | --- | --- |
| Ex. 6 | 86 | 4.1 | 15,300 | 2.7 |
| Ex. 7 | 112 | 5.2 | 14,000 | 1.8 |

The results given above in Table III were determined by standard measurements. Specifically, the heat deflection temperature was determined in accordance with ASTM D-648; flexural modulus and flexural strength were determined in accordance with ASTM D-790; and the Izod impact strength (unnotched) was determined in accordance with ASTM D-256. A review of the data of Table III demonstrates that the cured compositions of these Examples of the present invention exhibit useful physical properties.

The invention has been described in detail with particular reference to preferred embodiments thereof, but it will be understood that variations and modifications can be effected within the spirit and scope of the invention.

We claim:

1. An unsaturated polyester composition which comprises:
   (A) an unsaturated polyester which comprises the reaction product of (i) a diacid component which comprises at least about 50% by weight of an ethylenically unsaturated dicarboxylic acid and (ii) a diol component;

(B) a reactive solvent for said unsaturated polyester; and (C) at least about 0.5% by weight, based upon the total weight of the composition, of a carboxylated cellulose ester selected from carboxylated cellulose acetate, carboxylated cellulose propionate, carboxylated cellulose butyrate, carboxylated cellulose acetate propionate, carboxylated cellulose acetate butyrate, or a mixture thereof.

2. The unsaturated polyester composition of claim 1 wherein said ethylenically unsaturated diacid comprises maleic acid, fumaric acid, or a mixture thereof.

3. The unsaturated polyester composition of claim 1 wherein said diacid component further comprises isophthalic acid, phthalic acid, adipic acid, or a mixture thereof.

4. The unsaturated polyester composition of claim 1 wherein said ethylenically unsaturated diacid comprises about 60 to 80% by weight of said diacid component.

5. The unsaturated polyester composition of claim 1 wherein said diol component comprises ethylene glycol, propylene glycol, neopentyl glycol, 1,4-cyclohexanedimethanol, 2,2,4-trimethyl-1,3-pentanediol, or a mixture thereof.

6. The unsaturated polyester composition of claim 1 wherein said solvent comprises styrene.

7. The unsaturated polyester composition of claim 1 wherein said carboxylated cellulose ester comprises carboxylated cellulose acetate butyrate.

8. The unsaturated polyester composition of claim 1 wherein said carboxylated cellulose ester is present in an amount of about 1 to 25% by weight, based upon the total weight of the composition.

9. The unsaturated polyester composition of claim 8 wherein said carboxylated cellulose ester is present in an amount of about 5 to 15% by weight, based upon the total weight of the composition.

10. An unsaturated polyester composition which comprises
(A) an unsaturated polyester which comprises the reaction product of
(i) a diacid component which comprises about 60 to 80% by weight of an ethylenically unsaturated dicarboxylic acid comprising maleic acid, fumaric acid, or a mixture thereof and correspondingly about 20 to 40% by weight of an additional diacid comprising isophthalic acid, phthalic acid, adipic acid, or a mixture thereof, and
(ii) a diol comprising ethylene glycol, propylene glycol, neopentyl glycol, 1,4-cyclohexanedimethanol, 2,2,4-trimethyl-1,3-pentanediol, or a mixture thereof;
(B) a quantity of styrene which is sufficient to solvate said unsaturated polyester; and
(C) at least about 0.5 percent by weight, based upon the total weight of the composition, of a carboxylated cellulose ester selected from carboxylated cellulose acetate, carboxylated cellulose propionate, carboxylated cellulose butyrate, carboxylated cellulose acetate propionate, carboxylated cellulose acetate butyrate, or a mixture thereof.

11. The unsaturated polyester composition of claim 10 wherein said carboxylated cellulose ester comprises carboxylated cellulose acetate butyrate.

12. The unsaturated polyester composition of claim 10 wherein said carboxylated cellulose ester is present in an amount of about 1 to 25% by weight, based upon the total weight of the composition.

13. The unsaturated polyester composition of claim 12 wherein said carboxylated cellulose ester is present in an amount of about 5 to 15% by weight, based upon the total weight of the composition.

14. A process for the preparation of a cured unsaturated polyester composition which comprises the steps of:
(a) reacting (i) a diacid component which comprises at least about 50% by weight of an ethylenically unsaturated carboxylic diacid with (ii) a diol component so as to form an unsaturated polyester resin;
(b) dissolving said unsaturated polyester resin in a solvating quantity of a reactive solvent, the resulting solution further comprising at least about 0.5% by weight, based upon the total weight of said solution, of a carboxylated cellulose ester selected from carboxylated cellulose acetate, carboxylated cellulose propionate, carboxylated cellulose butyrate, carboxylated cellulose acetate propionate, carboxylated cellulose acetate butyrate, or a mixture thereof; and
(c) curing said solution in the substantial absence of additional initiator so as to form a substantially clear, solid unsaturated polyester composition.

15. The process of claim 14 wherein said curing is effected by heating said solution at a temperature of less than about 100° C.

16. The process of claim 15 wherein said curing is effected by heating said solution at a temperature of about 60° to 80° C.

17. The process of claim 14 wherein said ethylenically unsaturated diacid comprises maleic acid, fumaric acid, or a mixture thereof.

18. The process of claim 14 wherein said diacid component further comprises isophthalic acid, phthalic acid, adipic acid, or a mixture thereof.

19. The process of claim 14 wherein said ethylenically unsaturated diacid comprises about 60 to 80% by weight of said diacid component.

20. The process of claim 14 wherein said diol component comprises ethylene glycol, propylene glycol, neopentyl glycol, 1,4-cyclohexanedimethanol, 2,2,4-trimethyl-1,3-pentanediol, or a mixture thereof.

21. The process of claim 14 wherein said reactive solvent comprises styrene.

22. The process of claim 16 wherein said carboxylated cellulose ester comprises carboxylated cellulose acetate butyrate.

23. The process of claim 14 wherein said carboxylated cellulose ester is present in an amount of about 1 to 25% by weight, based upon the total weight of the composition.

24. The process of claim 23 wherein said carboxylated cellulose ester is present in an amount of about 5 to 15% by weight, based upon the total weight of the composition.

25. A process for the preparation of a cured unsaturated polyester composition which comprises the steps of:
(a) reacting
(i) a diacid component which comprises about 60 to 80% by weight of an ethylenically unsaturated dicarboxylic acid comprising maleic acid, fumaric acid, or a mixture thereof and correspondingly about 20 to 40% by weight of an additional diacid comprising isophthalic acid, phthalic acid, adipic acid, or a mixture thereof
with (ii) a diol comprising ethylene glycol, propylene glycol, neopentyl glycol, 1,4-cyclohexanedimethanol, 2,2,4-trimethyl-1,3-pentanediol, or a mixture thereof so as to form an unsaturated polyester resin;

(b) dissolving said unsaturated polyester resin in a solvating quantity of a reactive solvent comprising styrene, the resulting solution further comprising at least about 0.5% by weight, based upon the total weight of said solution, of a carboxylated cellulose ester selected from carboxylated cellulose acetate, carboxylated cellulose propionate, carboxylated cellulose butyrate, carboxylated cellulose acetate propionate, carboxylated cellulose acetate butyrate, or a mixture thereof;

(c) curing said solution at a temperature of 60° to 80° C. until a substantially clear, solid unsaturated polyester composition is obtained.

26. The process of claim 25 wherein said carboxylated cellulose ester comprises carboxylated cellulose acetate butyrate.

27. The process of claim 25 wherein said carboxylated cellulose ester is present in an amount of about 1 to 25% by weight, based upon the total weight of the composition.

28. The process of claim 27 wherein said carboxylated cellulose ester is present in an amount of about 5 to 15% by weight, based upon the total weight of the composition.

* * * * *